No. 636,153. Patented Oct. 31, 1899.
H. LOOG & R. R. GUBBINS.
WHEEL RIM FOR PNEUMATIC TIRES.
(Application filed June 5, 1899.)
(No Model.)
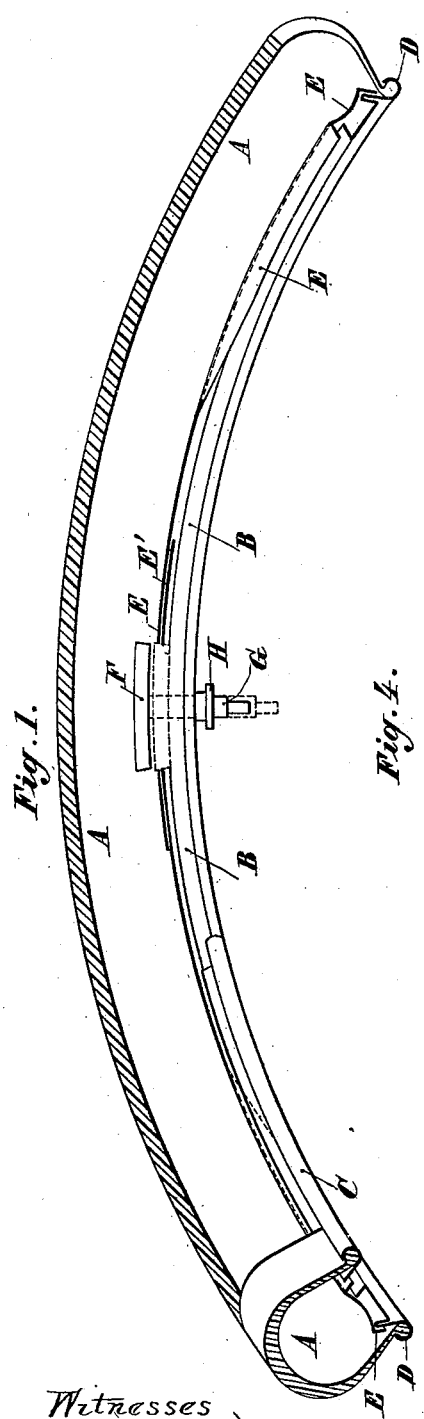
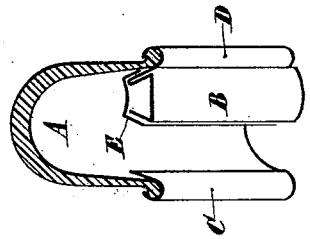
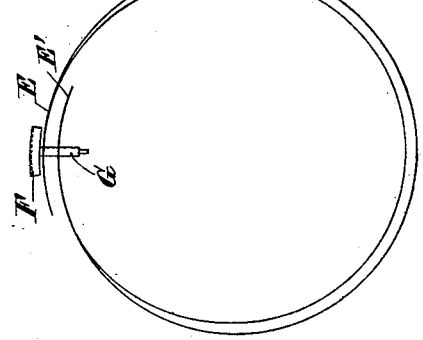
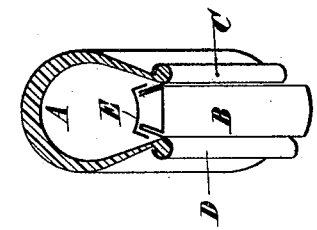
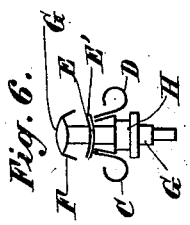
Witnesses
Inventors
Hermann Loog
Richard R. Gubbins
by James L. Norris

UNITED STATES PATENT OFFICE.

HERMANN LOOG AND RICHARD RUSSELL GUBBINS, OF LONDON, ENGLAND.

WHEEL-RIM FOR PNEUMATIC TIRES.

SPECIFICATION forming part of Letters Patent No. 636,153, dated October 31, 1899.

Application filed June 5, 1899. Serial No. 719,463. (No model.)

*To all whom it may concern:*

Be it known that we, HERMANN LOOG, residing at 36 Newgate street, and RICHARD RUSSELL GUBBINS, residing at 95 Pelton road, East Greenwich, London, England, subjects of the Queen of Great Britain, have invented certain new and useful Improvements in Rims of Wheels for Detachable Pneumatic Tires, of which the following is a specification.

Our invention relates to improvements connected with rims of wheels for pneumatic tires constructed in parts and held together when in use by a flanged band in such a way that the said rim may be opened for gaining access to the air chamber or tube without disturbing the outer cover from its fastening to the rim and without in any degree depending on the air-pressure in the tire as an aid to security. The means employed will be readily understood by reference to the accompanying drawings.

Figure 1 is a longitudinal section of part of a tire mounted on our improved divided rim. Fig. 2 is a transverse section of a similar tire, showing the divided rim closed. Fig. 3 is the same open, giving access to the air chamber or tube. Fig. 4 is a view, on a reduced scale, of the compressing-band used for holding the parts of the divided rim together. Fig. 5 is a side view of Fig. 4. Fig. 6 is a section of the rim and band close to the air-valve, Fig. 1.

Similar letters refer to similar parts throughout the drawings.

The rim B is placed between two rings D and C, which latter have tubular edges for receiving the beaded edges of the outer cover. One of them, D, may be made in one with the rim B, as shown in Figs. 1, 2, and 3. A flanged band E, the ends of which overlap, encircles the whole, as shown at Fig. 2. The valve G passes through a hole and slot E and E' in the said overlapping ends, allowing the band to expand and contract freely. The valve-stem is furnished with a nut H. It is obvious that the greater the pressure on the tire the tighter this band will grip the parts D, B, and C of the rim together, and when the pressure is removed it will easily yield and allow the ring D to separate from B, leaving a wide space between, as shown in Fig. 3, through which the air-tube may be handled.

In order to make the band E release the ring C more readily, its flanges are removed where its ends overlap on opposite sides of the valve-hole G. The flanges are tapered gently from this point until they obtain their full width, as shown in Figs. 1 and 4.

A clip F of similar section to the band E is mounted on the valve-stem G, and this holds the rings firmly together while the tire is inflated. The nut H is tightened and prevents subsequent movement of the parts in case of deflation through puncture or otherwise.

To open the rim, it is only necessary to loosen the nut enough to let the valve G, with its clip F, be forced up high enough to clear the band E, when the ring C will separate easily from B, as shown in Fig. 3.

What we claim, and desire to secure by Letters Patent, is—

1. In appliances for securing pneumatic tires to rims of wheels the combination of wheel-rim B, rings C, D, overlapping band E, cover A, valve G having tightening-nut H and clip F all arranged and acting substantially in the manner set forth.

2. In appliances for securing pneumatic tires to rims of wheels, the combination with the tire-cover A, and the rim B provided with a tubular-edged extension or ring D for attachment of one edge of the tire-cover, of the loose ring C attached to the other edge of said cover, the overlapping channeled band E encircling the rim B and rings C D for affixing the ring C to said rim by inflation of a tube contained within the tire-cover, the valve G, nut H and clip F, substantially as described.

3. In appliances for securing tire-covers to wheels, the combination with the cover A, rim B and rings C, D, of the band E having overlapping ends and provided with flanges for the greater part of its length gradually tapering to the overlapping ends of said band to enable the ring C to be more readily released, and means for securing said band, substantially as described.

In testimony whereof we have hereunto set our hands in presence of two subscribing witnesses.

HERMANN LOOG.
RICHARD RUSSELL GUBBINS.

Witnesses:
PERCY E. MATTOCKS,
EDMUND S. SNEWIN.